United States Patent
Martin

(10) Patent No.: US 12,103,202 B2
(45) Date of Patent: Oct. 1, 2024

(54) PROCESS FOR GRINDING MATERIALS

(71) Applicant: International Fine Chemistry, LLC, Evansville, IN (US)

(72) Inventor: Stanley V. Martin, Evansville, IN (US)

(73) Assignee: International Fine Chemistry, LLC, Evansville, IN (US)

( * ) Notice: Subject to any disclaimer, the term of this patent is extended or adjusted under 35 U.S.C. 154(b) by 690 days.

(21) Appl. No.: 17/205,423

(22) Filed: Mar. 18, 2021

(65) Prior Publication Data

US 2021/0291406 A1    Sep. 23, 2021

Related U.S. Application Data

(60) Provisional application No. 62/992,430, filed on Mar. 20, 2020.

(51) Int. Cl.
| | | |
|---|---|---|
| *B29B 13/10* | (2006.01) | |
| *B29B 9/12* | (2006.01) | |
| *B29B 13/04* | (2006.01) | |

(52) U.S. Cl.
CPC ............ *B29B 13/10* (2013.01); *B29B 13/045* (2013.01); *B29B 2009/125* (2013.01)

(58) Field of Classification Search
CPC . B29B 13/10; B29B 13/045; B29B 2009/125; B02C 19/186; B02C 23/38
USPC ..................................................... 241/16, 37
See application file for complete search history.

(56) References Cited

U.S. PATENT DOCUMENTS

| | | | | |
|---|---|---|---|---|
| 3,633,830 A | * | 1/1972 | Oberpriller | ........... B02C 18/148 241/18 |
| 4,025,990 A | * | 5/1977 | Lovette, Jr. | ......... B29B 17/0408 241/DIG. 31 |
| 4,102,503 A | * | 7/1978 | Meinass | ................. B02C 19/186 241/23 |
| 4,863,106 A | * | 9/1989 | Perkel | ................. B29B 17/0206 241/DIG. 31 |
| 2007/0034722 A1 | * | 2/2007 | Waznys | ................. B02C 19/186 241/23 |
| 2010/0224712 A1 | * | 9/2010 | Donckers, II | ......... B02C 19/186 241/23 |
| 2019/0023856 A1 | | 1/2019 | Yoshida | |

FOREIGN PATENT DOCUMENTS

| | | |
|---|---|---|
| CN | 103223369 A | 7/2013 |
| EP | 0317935 A2 | 5/1989 |
| EP | 0968080 B1 | 6/2002 |

OTHER PUBLICATIONS

Spencer Ind Inc, Thermoplastics defined (Oct. 17, 2023) (https://www.spencerindustries.com/the-basics-of-thermoplastic-production/#:~text=Thermoplastics%20can%20come%20from%20both,%2D%20and%20plant%2Dbased%20materials.) Site accessed Oct. 17, 2023 (Year: 2023).*

Wilczek et al., "Optimized Technologies for Cryogenic Grinding", Int. J. of Miner. Process., vol. 74S, Dec. 10, 2004, pp. S425-S434, 10 pages.

(Continued)

*Primary Examiner* — Bobby Yeonjin Kim
*Assistant Examiner* — Fred C Hammers
(74) *Attorney, Agent, or Firm* — Barnes & Thornburg LLP

(57) ABSTRACT

A process for grinding materials includes grinding a frozen plastic material to form a first-stage plastic material in a first mill. The first-stage plastic material is processed in a second mill to form material having a particle size less than about 100 μm.

17 Claims, 1 Drawing Sheet

(56) References Cited

OTHER PUBLICATIONS

Liang et al., "Production of Fine Polymer Powder under Cryogenic Conditions" Chem. Eng. Technol. 25, 2002, pp. 401-405, 5 pages.
Bruyère et al., "Cryogenic Ball Milling: A Key for Elemental Analysis of Plastic-Rich Automotive Shedder Residue" Powder Technology, vol. 294, Jun. 2016, pp. 454-462, 9 pages.

* cited by examiner

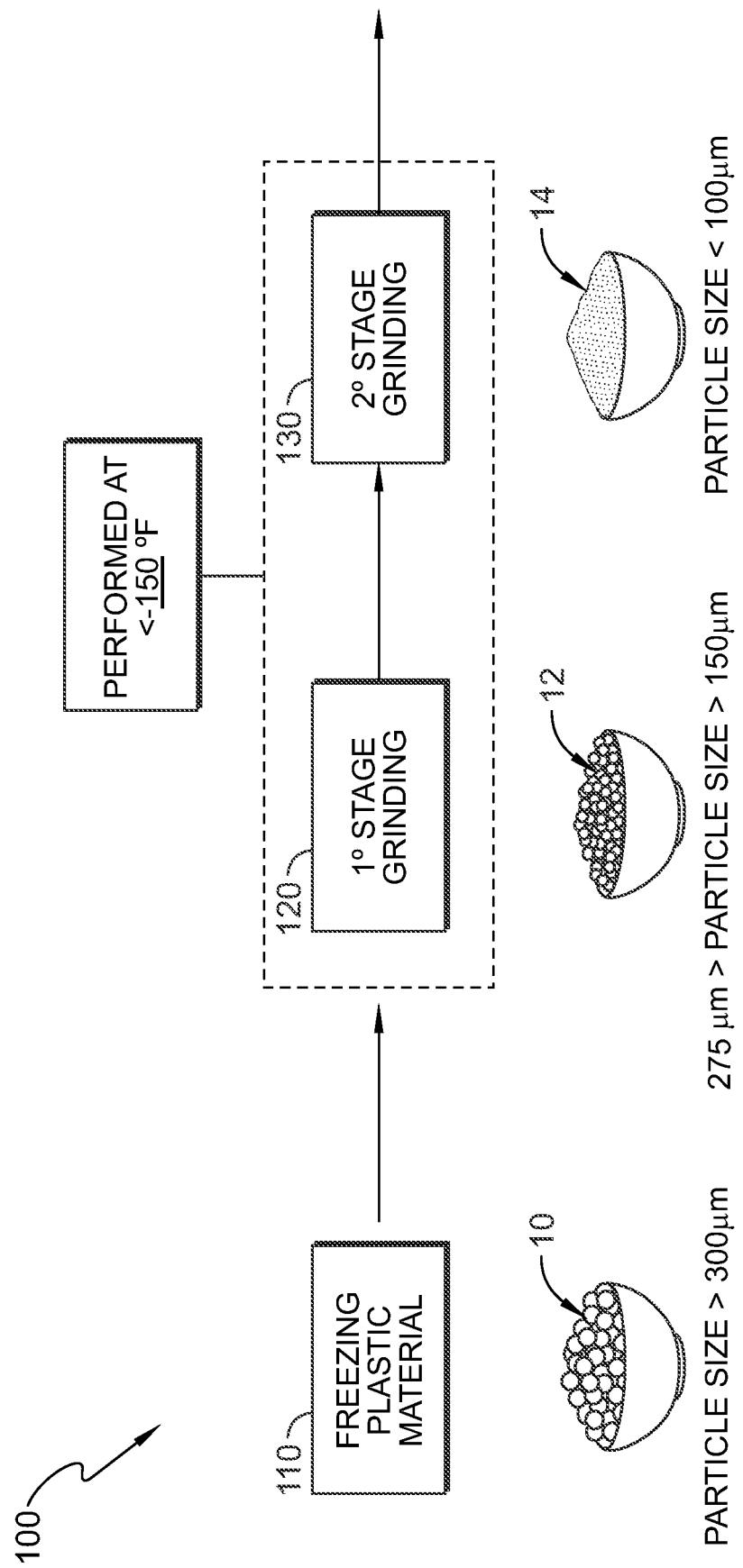

PROCESS FOR GRINDING MATERIALS

PRIORITY CLAIM

This application claims priority under 35 U.S.C. § 119(e) to U.S. Provisional Application Ser. No. 62/992,430, filed Mar. 20, 2020, which is expressly incorporated by reference herein.

BACKGROUND

The present disclosure relates a process for reducing the size of a particle, and particularly to a process for grinding a particle. More particularly, the present disclosure relates to a process for grinding a plastic material.

SUMMARY

In accordance with the present disclosure, a process includes grinding a plastic material to reduce a particle size of the plastic material. The process may include a first grinding step in which the plastic material is reduced to a first particle size and a second grinding step in which the plastic material is reduced to a second particle size less than the first particle size. The first grinding step may be performed in a first mill. The second grinding step may be performed in a second mill.

In illustrative embodiments, the process may further include a step of freezing the plastic material. The step of freezing may occur before or during the first grinding step. The freezing step may be performed by adding plastic material to liquid nitrogen at a temperature of lower than about −250° F. to form frozen plastic material.

In illustrative embodiments, the frozen plastic material may have a particle size of about 300 μm and above and a temperature lower than about −250° F. prior to the first grinding step. After the first grinding step, the plastic material may have a particle size between about 275 μm to about 150 μm and a temperature of at least −100° F. or less. After the second grinding step, the plastic material may have a particle size of about 100 μm or less. Subjecting the plastic material to low temperatures may increase a brittleness and/or a fracturability of the plastic material so that a throughput rate of the process is increased.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying FIGURES in which:

FIG. 1 is a diagrammatic and perspective view of a material grinding process showing that the process includes, from left to right, freezing a plastic material to form a frozen plastic material and grinding the frozen plastic material to form a plastic material having a particle size less than about 100 μm.

DETAILED DESCRIPTION

A process 100 for grinding materials is shown in the FIG. 1. Process 100 converts particles of a plastic material 10 having a particle size of at least about 300 μm to a plastic material having a particle size of less than about 100 μm. In illustrative embodiments, portions of process 100 are performed under conditions that increase the brittleness of plastic material 10 so that plastic material 10 is capable of being milled without melting. In illustrative embodiments, such conditions include grinding the plastic material when the plastic material has a temperature of less than about −150° F. Performing process 100 under such conditions may reduce the particle size of plastic material 10 for use in applications desiring plastic material having particle size of less than 100 μm such as 3-D printing.

In illustrative embodiments, plastic material 10 comprises plastic particles that are, for example, in pellet or flake form. Illustratively, plastic material 10 may be a strand, a pellet, or a flake. The plastic particles of plastic material 10 may have a particle size of greater than about 300 μm or greater than about 350 μm. In some embodiments, plastic material 10 comprises particles having a size of about 300 μm to about 350 μm. In some embodiments, plastic material 10 is a ¼" pellet or flake. In some embodiments, plastic material 10 includes 1 inch strands. In some embodiments, plastic material 10 is about 200 μm to about 2.5 cm. In some embodiments, plastic material 10 is about 300 μm to about 2.5 cm.

Process 100 may be applied to a variety of plastic materials 10, for example, engineering plastics. In some embodiments, plastic material 10 comprises engineering plastics such as polycarbonate, polylactic acid, polyethylimide, polyethylene, nylon, polycaprolactam, polytetrafluoroethylene, any other suitable material, or a mixture thereof.

Process 100 reduces the particle size of plastic material 10, as shown in FIG. 1. Plastic material 10 may have a particle size greater than about 300 μm or greater than about 350 μm. In some embodiments, process 100 may be performed at a low temperature. Performing at least some steps of process 100 at a low temperature may improve the fracturability of plastic material 10.

In illustrative embodiments, process 100 includes a step of freezing 110 plastic material 10, as shown in FIG. 1. For example, freezing step 110 may be performed by adding plastic material 10 to liquid nitrogen at a temperature of lower than about −250° F. In illustrative embodiments, freezing step 110 freezes plastic material 10 to form frozen plastic material 10.

Process 100 includes a first grinding stage 120 that reduces the particle size of the frozen plastic material 10, as shown in FIG. 1. In some embodiments, the frozen plastic material 10 is ground in first grinding stage 120 from a particle size of greater than about 300 μm to form a first-stage plastic material 12 having a particle size of last than about 300 μm. In illustrative embodiments, first grinding stage 120 is performed at a temperature less than about −250° F. In some embodiments, first grinding stage 120 is performed in the presence of liquid nitrogen.

Grinding stage 120 reduces the particle size of plastic material 10 to form first-stage plastic material 12 as shown in FIG. 1. First-stage plastic material 12 may comprise particles having a particle size less than about 300 μm or less than about 250 μm. In some embodiments, first-stage plastic material 12 comprises particles having a size of about 150 μm to about 275 μm. In some embodiments, first-stage plastic material 12 is about 200 μm to about 2.5 cm or is about 300 μm to about 2.5 cm. In illustrative embodiments, grinding stage 120 is performed in an attrition mill. In illustrative embodiments, grinding stage 120 is performed in an attrition dual plate mill, a hammer mill, a ball mill, an air swept jet mills, or any suitable alternative. In some embodiments, the plastic material 10 is exposed to liquid nitrogen and frozen prior to being placed in the mill. In some embodiments, the liquid nitrogen is introduced in the mill with the plastic material 10 before or during grinding stage 120 to form first-stage plastic material 12. In some embodiments, the first-stage plastic material may be refrozen after grinding stage 120.

Process 100 includes a second grinding stage 130 as shown in FIG. 1. Grinding stage 130 reduces the particle size of first-stage plastic material 12 to form a second-stage plastic material 14. In some embodiments, first-stage plastic material 12 is conveyed directly to grinding stage 130 to minimize temperature increase of first-stage plastic material 12. Illustratively, directly conveying first-stage plastic material 12 allows for first-stage plastic material 12 to remain at a low temperature for grinding stage 130. Illustratively, directly conveying first-stage plastic material 12 allows for first-stage plastic material 12 to be at a temperature lower than about −100° F. or lower than about −175° F. as it enters the mill in grinding stage 130.

In illustrative embodiments, grinding stage 130 is performed in a mill that reduces the particle size of plastic material 12 to second-stage plastic material 14 having particle size of less than 100 μm, as shown in FIG. 1. In some embodiments, the mill of grinding stage 130 is a jet mill. In illustrative embodiments, grinding stage 130 is performed in an attrition dual plate mill, a hammer mill, a ball mill, an air swept jet mill, or any suitable alternative. Illustratively, the mill used in grinding stage 130 may include openings such that the mill may not be suitable for use with liquid nitrogen. Second-stage plastic material 14 may comprise particles having a particle size less than about 100 μm or less than about 75 μm. In some embodiments, second-stage plastic material 14 comprises particles having a size of about 50 μm to about 100 μm. In some embodiments, second-stage plastic material 14 comprises particles having a size of about 50 μm to about 75 μm. In some embodiments, second-stage plastic material 14 comprises particles having a size of about 50 μm. In some embodiments, second-stage plastic material 14 comprises particles having a size of about 75 μm. In some embodiments, second-stage plastic material 14 comprises particles having a size of about 100 μm. In one example, second-stage plastic material 14 having a particle size less than about 100 μm may be used in 3-D printing, fracking, filtration, pharmaceutical applications, or any other suitable applications.

As described herein, process 100 can have a higher throughput than a comparable process lacking freezing step 110, a refreezing step, or both. In illustrative embodiments, process 100 can be performed as a continuous process. In the continuous process, first-stage plastic material 12 is not isolated prior to grinding stage 130. Illustratively, the continuous process may have a throughput rate of plastic material 10 to second-stage plastic material 14 of at least 50 lbs/hour or at least 70 lbs/hour.

The invention claimed is:

1. A process for grinding materials, the process comprising,
freezing a plastic material having a particle size of at least 300 μm to form a frozen plastic material,
grinding the frozen plastic material in a first mill to form first-stage plastic material having a particle size of less than 300 μm, and
grinding the first-stage plastic material in a second mill to form a second-stage plastic material having a particle size less than about 100 μm,
wherein the first-stage plastic material is transferred directly from the first mill to the second mill after the step of grinding the frozen plastic material, and the first-stage plastic material is not refrozen prior to the step of grinding the first-stage plastic material in the second mill.

2. The process of claim 1, wherein each step of grinding is performed while the frozen plastic material and the first-stage plastic material each have a temperature lower than about −200° F.

3. The process of claim 2, wherein the frozen plastic material has a temperature of lower than about −300° F.

4. The process of claim 1, wherein the first mill is in an attrition mill.

5. The process of claim 4, wherein the second mill is a jet mill.

6. The process of claim 1, wherein the process changes from grinding the first-stage plastic material to grinding the second-stage plastic material in a continuous, uninterrupted manner.

7. The process of claim 1, wherein the plastic material comprises polycarbonate, polylactic acid, polyethylimide, polyethylene, polycaprolactam, polytetrafluoroethylene, nylon, or a mixture thereof.

8. The process of claim 1, wherein the step of freezing the plastic material occurs while the plastic material is in the first mill.

9. The process of claim 1, wherein the step of freezing the plastic material occurs prior to placing the plastic material in the first mill.

10. The process of claim 1, further comprising a step of refreezing the first-stage plastic material prior to transferring the first-stage plastic material to the second mill.

11. The process of claim 1, wherein the process has a throughput rate of at least 50 lbs/hour of second-stage plastic material.

12. The process of claim 11, wherein the process has a throughput rate of at least 70 lbs/hour of second-stage plastic material.

13. The process of claim 1, wherein the first-stage plastic material maintains a low temperature of no more than −100° F. as the first-stage plastic material is transferred directly from the first mill to the second mill.

14. The process of claim 1, wherein the first-stage plastic material maintains a low temperature of no more than −175° F. as the first-stage plastic material is transferred directly from the first mill to the second mill.

15. The process of claim 1, wherein the first mill is enclosed and liquid nitrogen is introduced to the plastic material to form the frozen plastic material before or in the first mill, and the second mill includes openings such that the second mill is not suitable for use with liquid nitrogen and the first stage plastic material is not refrozen before or in the second mill.

16. The process of claim 15, wherein the first-stage plastic material maintains a low temperature of no more than −175° F. as the first-stage plastic material is transferred directly from the first mill to the second mill.

17. The process of claim 16, wherein the process changes from grinding the frozen plastic material in the first mill to grinding the first-stage plastic material in the second mill in a continuous, uninterrupted manner such that the first-stage plastic material is not isolated prior to being ground in the second mill.

* * * * *